(12) United States Patent
Liang et al.

US008334856B2

(10) Patent No.: US 8,334,856 B2
(45) Date of Patent: Dec. 18, 2012

(54) STYLUS

(75) Inventors: Shi-Xu Liang, Shenzhen (CN); Chung-Yeh Sa, Santa Clara, CA (US)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 211 days.

(21) Appl. No.: 12/848,334

(22) Filed: Aug. 2, 2010

(65) Prior Publication Data
US 2011/0261023 A1 Oct. 27, 2011

(30) Foreign Application Priority Data
Apr. 23, 2010 (CN) .......................... 2010 1 0154741

(51) Int. Cl.
*G06F 3/041* (2006.01)
(52) U.S. Cl. ...................................... 345/179; 345/173
(58) Field of Classification Search .................. 401/55, 401/99, 100, 104–107, 196, 197, 202, 208, 401/209, 213, 192, 195, 243; 708/107; 345/173, 345/179, 174, 175, 176; 178/19.01, 19.03, 178/19.04, 19.02; 700/94
See application file for complete search history.

(56) References Cited

U.S. PATENT DOCUMENTS

| 7,131,356 | B2 * | 11/2006 | Lin | 81/180.1 |
| 7,195,415 | B1 * | 3/2007 | Vial | 401/216 |
| RE40,272 | E * | 4/2008 | Chan | 401/131 |
| 8,147,159 | B2 * | 4/2012 | Glesser et al. | 401/195 |
| 2005/0057535 | A1 * | 3/2005 | Liu et al. | 345/179 |
| 2010/0302213 | A1 * | 12/2010 | Yeh | 345/179 |

* cited by examiner

*Primary Examiner* — Kent Chang
*Assistant Examiner* — Nelson Rosario
(74) *Attorney, Agent, or Firm* — Altis Law Group, Inc.

(57) ABSTRACT

A stylus comprises a shell, a stylus body and at least one stopping member. The shell has a compartment defined therethrough, the shell further has at least one first stopping hole and at least one second stopping hole defined in an inner surface thereof and adjacent to the first stopping hole. The stylus body is accommodated in the compartment and is capable of tilting relative to the shell. The at least one stopping member is retractably mounted to the stylus body, each stopping member is configured for selectively resisted one first stopping hole and one second stopping hole with the tilting of the stylus body relative to the shell so as to orient the stylus body in a retracted state or in a tilted state.

13 Claims, 7 Drawing Sheets

STYLUS

CROSS-REFERENCE TO RELATED APPLICATIONS

This application is related to co-pending U.S. patent application Ser. Nos. 12/848,330, 12/848,337 AND 12/848,343, entitled "STYLUS", by Liang et al. These applications have the same assignee as the present application and have been concurrently filed herewith. The above-identified applications are incorporated herein by reference.

BACKGROUND

1. Technical Field

This exemplary disclosure generally relates to styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, stylus bodies of typical styluses can not rotate relative to housings and thereof can be convenient to use.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
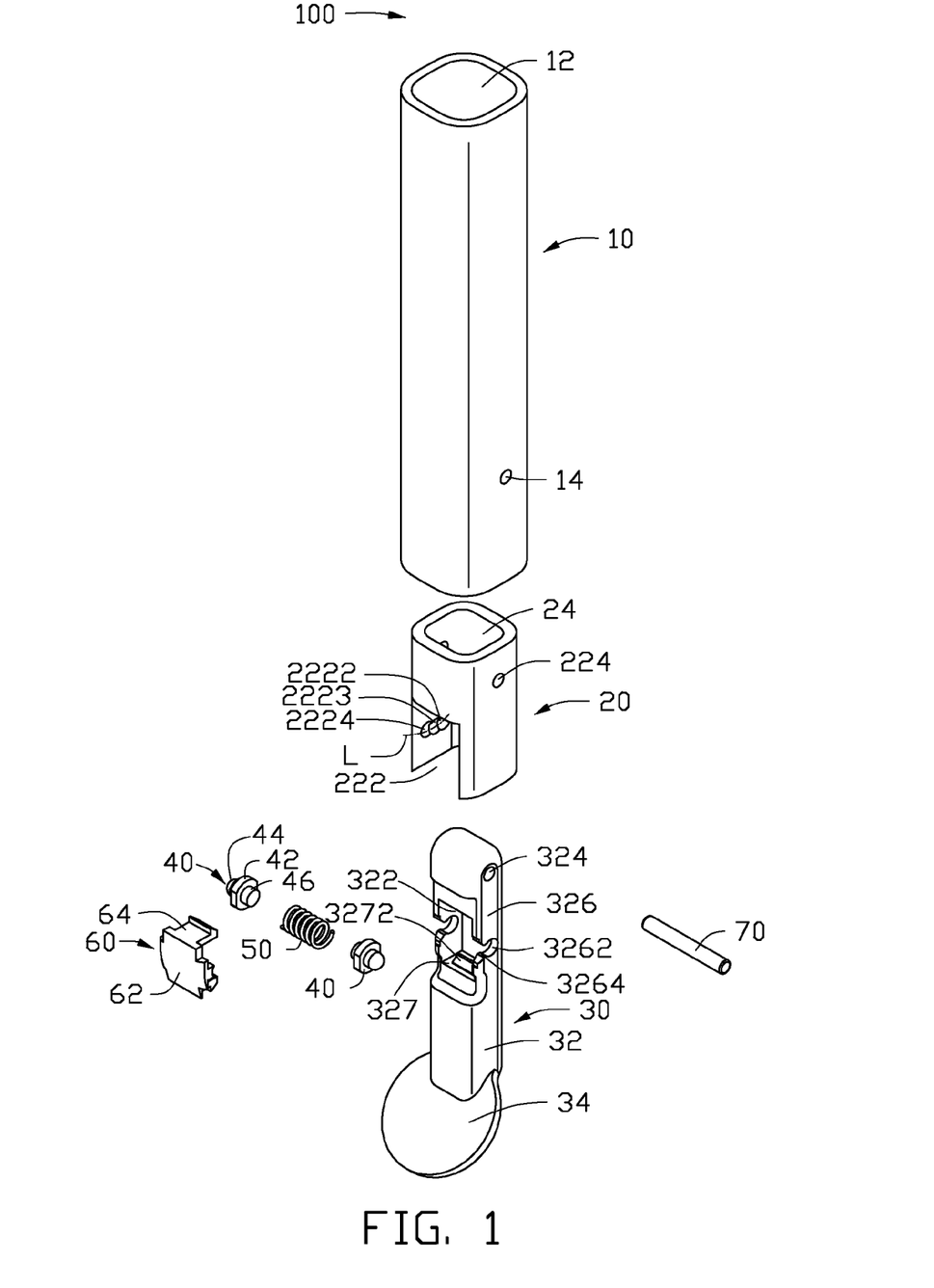
FIG. 1 is an exploded view of an exemplary stylus.
Figure 3:
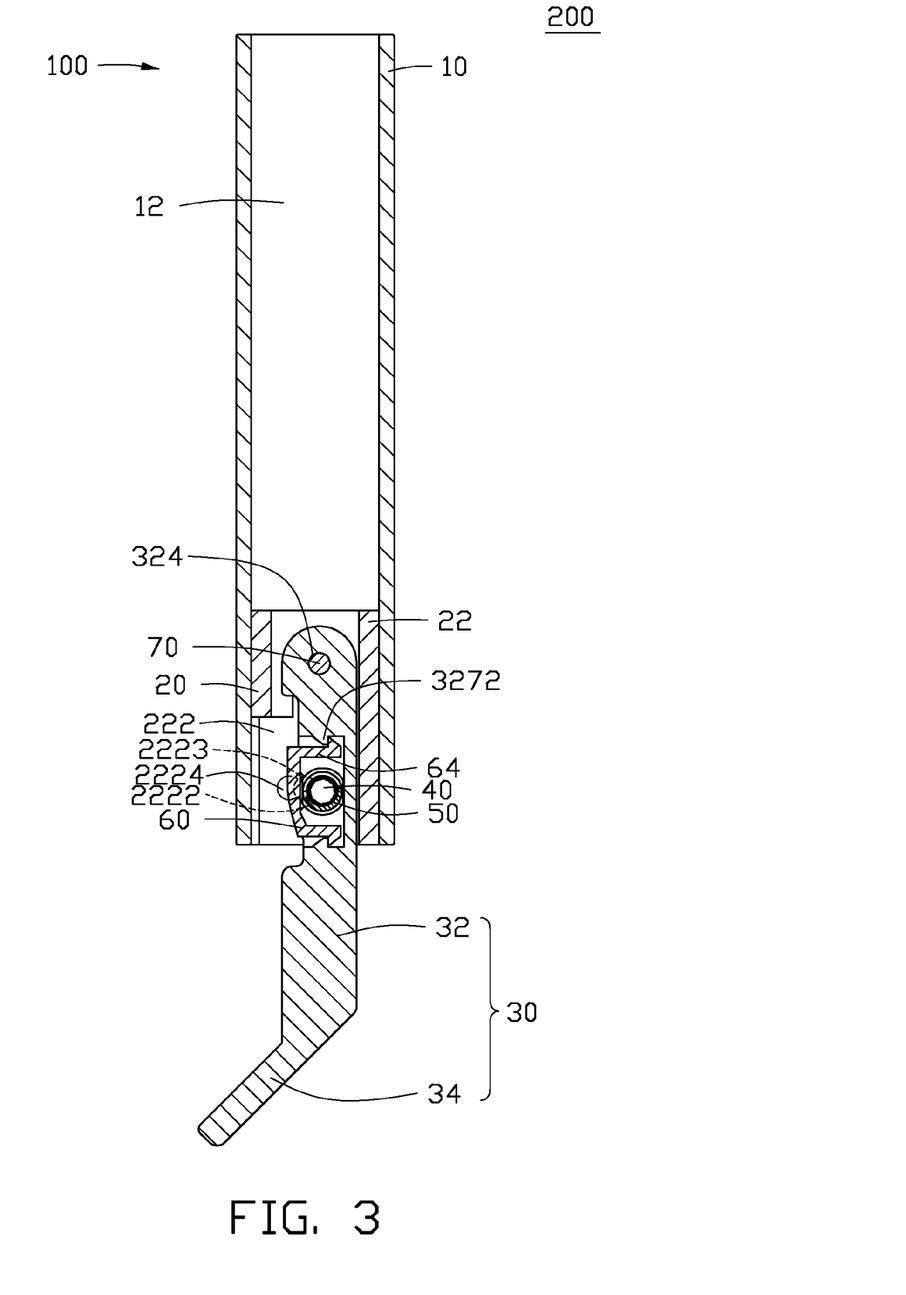
FIG. 3 is a cross-sectional view of the stylus shown in FIG. 2 along the line III-III, and wherein the stylus is in a retracted state.
Figure 4:
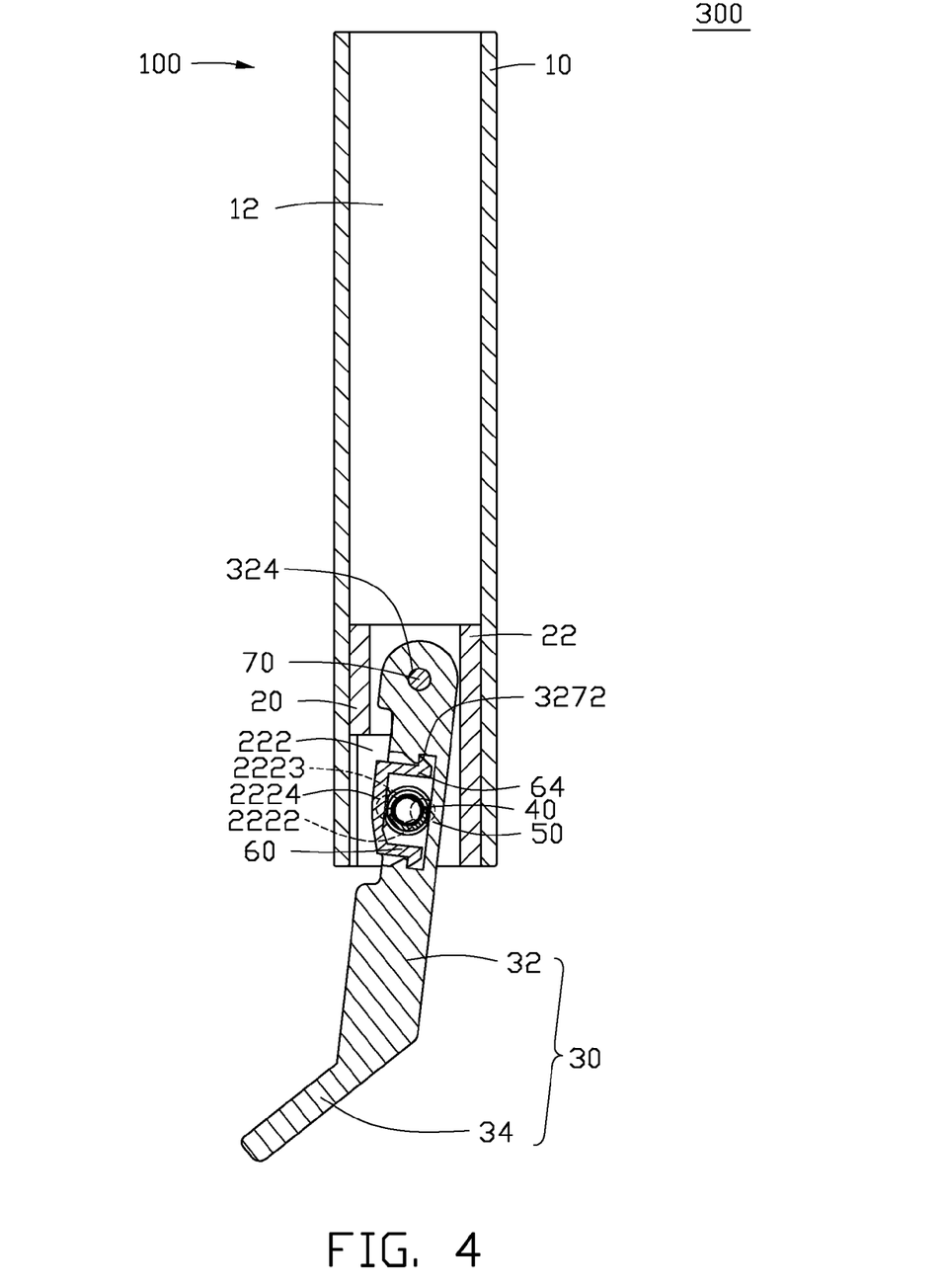
FIG. 4 is similar to FIG. 3, but wherein the stylus is in a tilted state.
Figure 5:
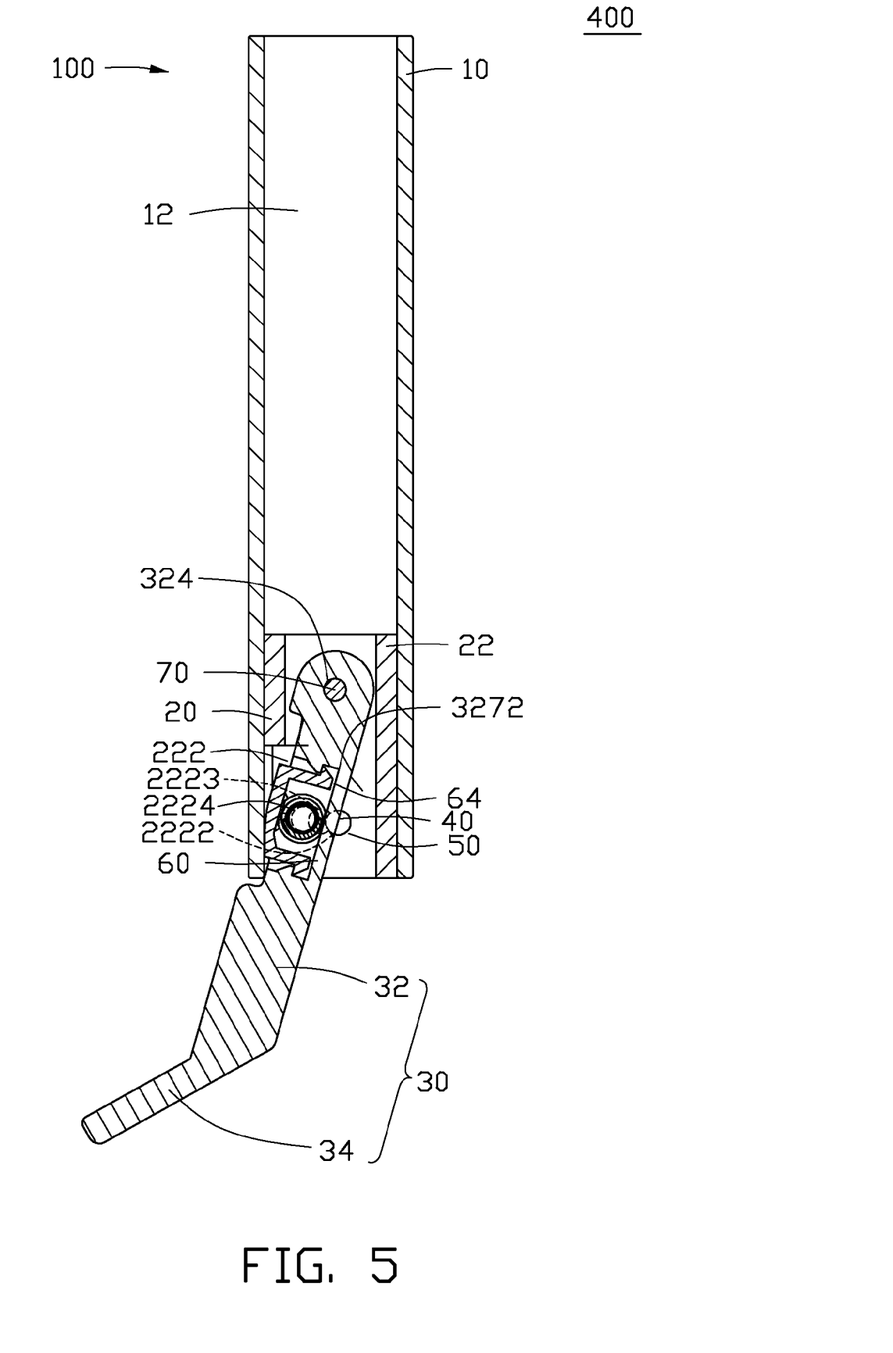
FIG. 5 is similar to FIG. 4, but wherein the stylus is in another tilted state.

Referring to FIGS. 1 and 3, the stylus 100 includes a housing 10, a shell 20 mounted in the housing 10, a stylus body 30 rotatably mounted to one end of the shell 20, two stopping members 40 mounted to the stylus body 30 for stopping the stylus body 30 in a retracted state 200 shown in FIG. 3, a first tilted state 300 shown in FIG. 4 and a second tilted state 400 shown in FIG. 5. The stylus 100 further includes an elastic member 50 positioned between the stopping members 40, and a cover 60 mounting to the stylus body 30 for shielding the stopping member 40 and the elastic member 50. The stylus body 30 is rotatably mounted to the shell 20 by a pin 70, and two ends of the pin 70 are retained to the housing 10 to mount the shell 20 to the housing 10.

The housing 10 is hollow, and longitudinally defines a receptacle 12 therethrough. The housing 10 further includes two aligned retaining holes 14 defined at one end thereof. The retaining holes 14 are for retaining the pin 70 to the housing 10.

Figure 6:
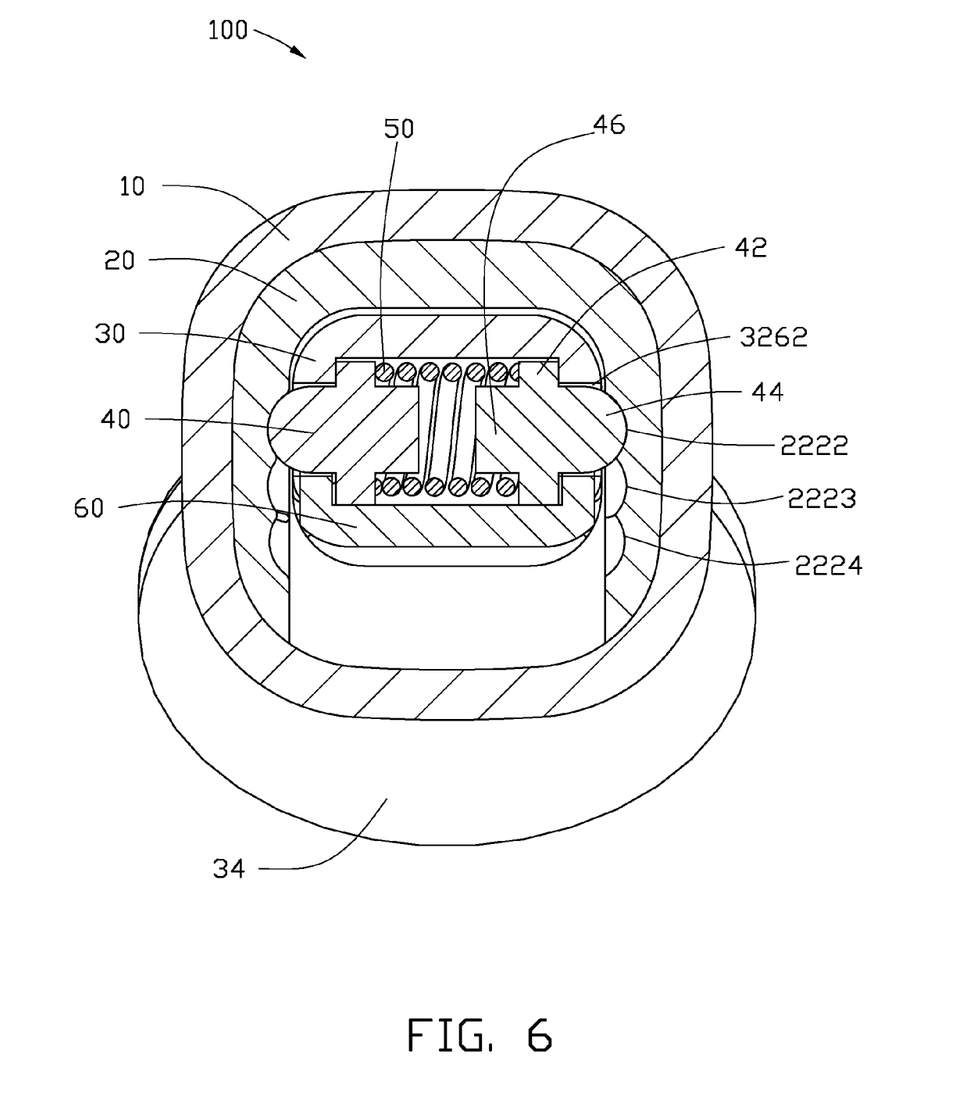
FIG. 6 is a cross-sectional view of the stylus shown in FIG. 2 along the line VI-VI.

The shell 20 is tubular and has generally the same shape as, but is slightly smaller than the receptacle 12 of the housing 10 so the shell 20 can be accommodated in the receptacle 12. The shell 20 includes a compartment 24 longitudinally defined therethrough for accommodating the stylus body 30. One end of the shell 20 transversely defines two aligned bores 224 for retaining the pin 70 therein. When the shell 20 is located in the housing 10, the bores 224 are aligned with the retaining holes 14. Another end of the shell 20 defines a notch 222 therethrough to provide a tilting space for the stylus body so the stylus body 30 can tilt relative to the shell 20 (see FIG. 4). Referring to FIG. 6, the shell 20 further defines two aligned first stopping holes 2222, two aligned second stopping holes 2223 and two aligned third stopping holes 2224, and the connecting line L of each first stopping hole 2222, neighboring second stopping hole 2223 and neighboring third stopping hole 2224 is an arc centered at neighboring bore 224. Each first stopping hole 2222 latches with one of the stopping members 40 so the stylus body 30 is held in the retracted state 200. Each second stopping hole 2223 latches with one of the stopping members 40 so the stylus body 30 is held in the first tilted state 300. Each third stopping hole 2224 latches with one of the stopping members 40 so the stylus body 30 is held in the second tilted state 400.

The stylus body 30 includes a body 32 and a head 34 protruding from the body 32. The body 32 defines an orifice 324 at one end thereof and engaging around the pin 70. When the stylus body 30 is mounted in the shell 20, the orifice 324 is aligned with the bores 224. The body 32 further defines a mounting groove 322 that is enclosed by two opposite sidewalls 326 and two opposite end walls 327. The mounting groove 322 is for mounting the stopping members 40 and the elastic member 50 to the stylus body 30. The body 32 defines two aligned openings 3262, and each of which is defined through one of the sidewalls 326. Each opening 3262 is for one of stopping members 40 to pass through corresponding sidewall 326. Each sidewall 326 further defines a guiding groove 3264 communicating with corresponding opening 3262 for guiding the stopping members 40 to the openings 3262. Each end wall 327 protrudes a hook 3272 for latching the cover 60 the stylus body 30.

The stopping members 40 are illustrated in FIGS. 1 and 6. The stopping members 40 are coupled between the shell 20 and the stylus body 30 for holding the stylus body 30 in the retracted state 200, the first tilted state 300 and the second tilted state 400. In this exemplary embodiment, each stopping member 40 includes a resisting board 42, a stopping block 44 protruding from one side of the resisting board 42 and a retaining block 46 protruding from another side of the resisting board 42. Each resisting board 42 resists one of sidewalls 326 to prevent the stopping members 40 from separating from the stylus body 30. Each stopping block 44 passes through one of the openings 3262 to latch with corresponding first stopping hole 2222, corresponding second stopping hole 2223 and corresponding third stopping hole 2224. The retaining blocks 46 are for retaining the elastic member 50 therebetween.

The cover 60 includes a plate 62 and two catches 64 bending from two opposite side of the plate 62. Each catch 64 latches with one of hooks 3272 to retain the cover 60 to the stylus body 30. When the cover 60 mounts to the stylus body 30, the plate 62 resists the stopping members 40 to firmly hold the stopping members 40 in the stylus body 30.

Figure 2:
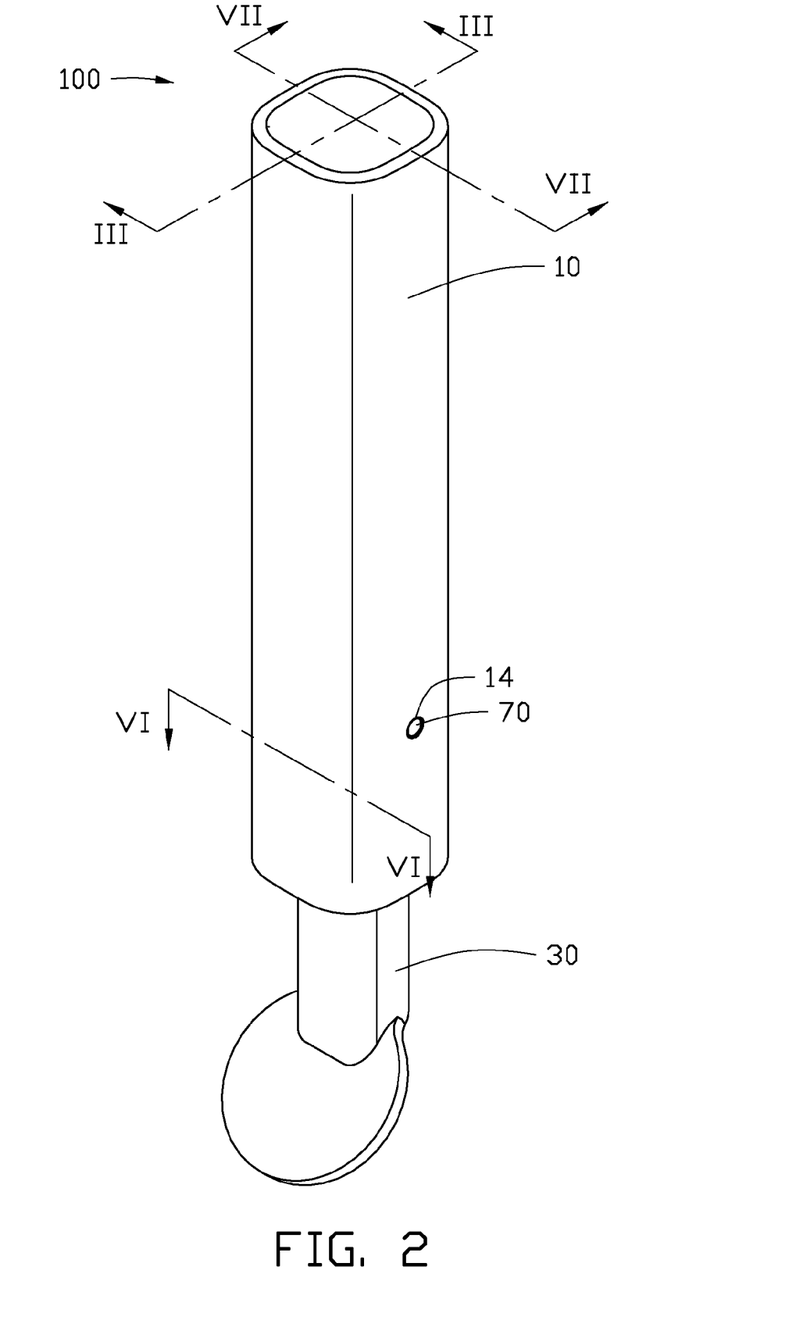
FIG. 2 is an assembled view of the stylus shown in FIG. 1.
Figure 7:
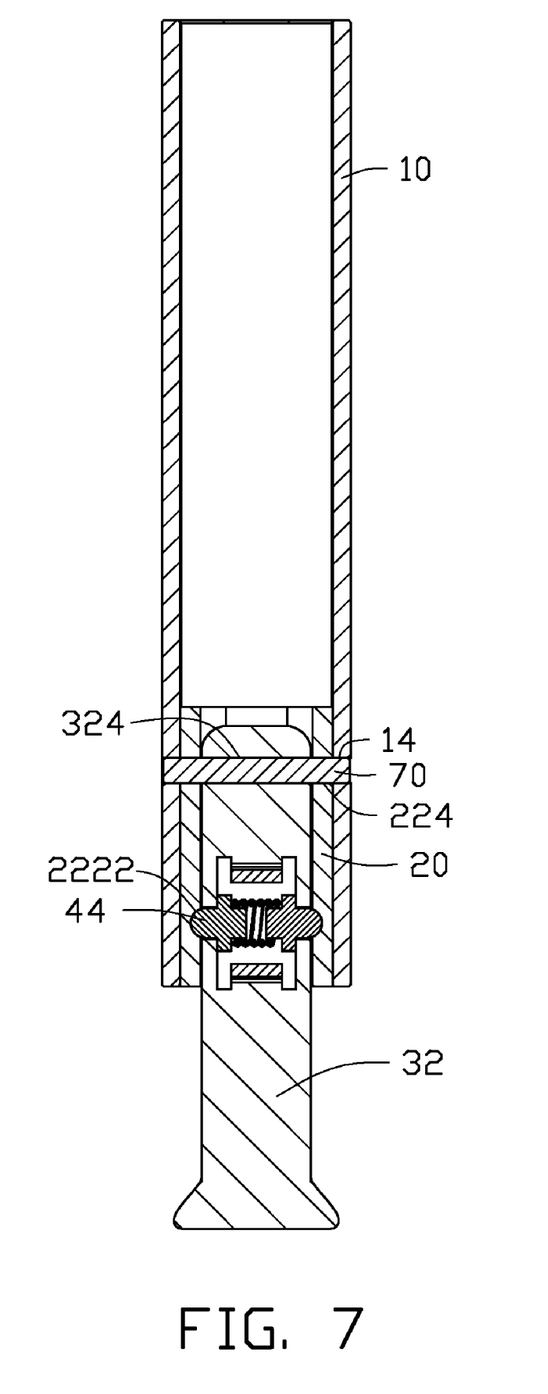
FIG. 7 is a cross-sectional view of the stylus shown in FIG. 2 along the line VII-VII.

Referring to FIGS. 1 and 6, in assembly, two ends of the elastic member 50 are respectively wrapped around the retaining blocks 46 to hold the elastic member 50 between the stopping members 40. The stopping members 40 are pushed toward each other so the elastic member 50 is compressed to exert elastic force on the stopping members 40. The stopping blocks 44 respectively enter into the openings 3262 by the guiding of the guiding grooves 3264. Then the stopping members 40 move away from each other under the elastic force of the elastic member 50, until the resisting boards 42 resist the sidewalls 326. Referring to FIGS. 1 and 3, the catches 64 latch with the hooks 3272 to retain the cover 60 to the stylus body 30. Referring to FIGS. 1, 2 and 7, the shell 20 is inserted into the receptacle 12 until the bores 224 are aligned with the retaining holes 14. The stylus body 30 is then inserted into the compartment 24 until the orifice 324 is aligned with the bores 224 and the stopping blocks 44 latch with the first stopping holes 2222. The pin 70 is inserted into the retaining holes 14, the bores 224 and the orifice 324 to hold the shell 20 and the stylus body 30 in the housing 10.

Referring to FIGS. 3-6, in operation, the stylus body 30 rotates about the pin 70 relative to the shell 20 so the stopping blocks 44 slide out of the first stopping holes 2222 until to latch with the second stopping holes 2223, the stylus body 30 enter into the notch 222 so the stylus body 30 is located in the first tilted state 300. Continue to rotate the stylus body 30, the stopping blocks 44 will slide out of the second stopping holes 2223 until to latch with the third stopping holes 2224 so the stylus body 30 is located in the second tilted state 400 for the convenience of using it.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
 a shell having a compartment defined therethrough, one end of the shell defining two aligned bores, another end of the shell including two opposite inner surfaces, each inner surface defining a first stopping hole, a second stopping hole and a third stopping hole overlapped to each other, a connecting line of each first stopping hole, each neighboring second stopping hole and each neighboring third stopping hole being an arc centered at each neighboring bore;
 a stylus body accommodated in the compartment, the stylus body rotatable connected to the bores with a pin and being capable of tilting relative to the shell; and
 two stopping members retractably mounted to the stylus body, each stopping member being configured for selectively resisted one of the first stopping holes, the second stopping and the third stopping holes with the tilting of the stylus body relative to the shell so as to orient the stylus body in a retracted state or in two different tilted states.

2. The stylus as claimed in claim 1, wherein the shell further defines a notch to provide a tilting space for the stylus body tilting relative the shell tilted state, and the two inner surfaces are in the notch.

3. The stylus as claimed in claim 1, wherein the stylus body defines an orifice therethrough that is aligned with the bores; the pin is tightly fitted in the bores and the orifice to mount the stylus body to the shell.

4. The stylus as claimed in claim 1, wherein the stylus body further defines a mounting groove for mounting each stopping member to the stylus body, the mounting groove is enclosed by two opposite sidewalls and two opposite end walls, each sidewall defines an opening, each stopping member passes through the sidewalls via each opening.

5. The stylus as claimed in claim 4, wherein each stopping member includes a resisting board and a stopping block protruding from one side of the resisting board, each resisting board resists one of sidewalls to prevent the stopping members from separating from the stylus body, each stopping block passes through the opening to latch with one of each first stopping hole, each second stopping hole and each third stopping hole.

6. The stylus as claimed in claim 5, wherein the stylus further includes an elastic member coupled between the stopping members to exert a force on the stopping members such that the stopping blocks elastically latch in one of each first stopping hole, each second stopping hole and each third stopping hole.

7. The stylus as claimed in claim 6, wherein each stopping member further includes a retaining block protruding from another side of the resisting board, each end of the elastic member wraps around one of the retaining blocks.

8. The stylus as claimed in claim 4, wherein the stylus further includes a cover latched to the mounting groove of the stylus body and resists the stopping member to firmly hold the stopping member in the stylus body.

9. The stylus as claimed in claim 8, wherein the cover includes a plate and two catches bending from two opposite side of the plate; each end wall protrudes a hook for latching the catches so the cover is latched to the stylus body.

10. A stylus, comprising:
 a housing;
 a shell received in the housing, the shell having a compartment defined therethrough, the shell further having two opposite first stopping holes and two opposite second stopping holes defined in opposite inner surface thereof, each first stopping hole being neighboring and overlapping to one of the two second stopping holes;
 a stylus body mounted in the compartment, a pin extending through the housing, the shell and the stylus body to hold the shell and the stylus body in the housing; and
 two stopping members retractably mounted to the stylus body, wherein each stopping member latches with one of the first stopping holes to locate the stylus body in a retracted state, and when the stylus body tilts relative to the shell, the stopping members slide out of the first stopping holes until each stopping member latches with one of the second stopping holes to locate the stylus body in a tilted state.

11. The stylus as claimed in claim 10, wherein the stylus body further defines a mounting groove for mounting each stopping member to the stylus body, the mounting groove is enclosed by two opposite sidewalls and two opposite end walls, each sidewall defines an opening, each stopping member passes through the sidewalls via each opening.

12. The stylus as claimed in claim 11, wherein each stopping member includes a resisting board and a stopping block protruding from one side of the resisting board, each resisting board resists one of sidewalls to prevent the stopping members from separating from the stylus body, each stopping block passes through the opening to latch with one of each first stopping hole and each second stopping hole.

13. The stylus as claimed in claim 12, wherein the stylus further includes an elastic member coupled between the stopping members to exert a force on the stopping members, each stopping member further includes a retaining block protruding from another side of the resisting board, each end of the elastic member wraps around one of the retaining blocks.

* * * * *